US010523792B2

(12) United States Patent
Bauer et al.

(10) Patent No.: US 10,523,792 B2
(45) Date of Patent: Dec. 31, 2019

(54) UNIVERSAL FRAMEWORK FOR CONNECTIVITY OF DEVICES AND DEVELOPMENT TOOLS

(71) Applicant: Embarcadero Technologies, Inc., Austin, TX (US)

(72) Inventors: Allen Bauer, Scotts Valley, CA (US); Michael L. Swindell, Aptos, CA (US)

(73) Assignee: Embarcadero Technologies, Inc., Austin, TX (US)

( * ) Notice: Subject to any disclaimer, the term of this patent is extended or adjusted under 35 U.S.C. 154(b) by 0 days.

(21) Appl. No.: 16/286,417

(22) Filed: Feb. 26, 2019

(65) Prior Publication Data

US 2019/0191013 A1    Jun. 20, 2019

Related U.S. Application Data

(62) Division of application No. 15/081,724, filed on Mar. 25, 2016, now Pat. No. 10,257,320.

(51) Int. Cl.
*H04L 29/06* (2006.01)
*H04L 29/08* (2006.01)

(52) U.S. Cl.
CPC .............. *H04L 69/08* (2013.01); *H04L 67/12* (2013.01)

(58) Field of Classification Search
CPC ................................ H04L 67/12; H04L 69/08
See application file for complete search history.

(56) References Cited

U.S. PATENT DOCUMENTS

| | | | |
|---|---|---|---|
| 2004/0187140 A1* | 9/2004 | Aigner | G06F 8/20 719/328 |
| 2012/0011233 A1 | 1/2012 | Dixon et al. | |
| 2013/0167250 A1* | 6/2013 | Balasubramanian | G06F 21/10 726/28 |
| 2015/0067188 A1 | 3/2015 | Chakhaiyar | |
| 2016/0110236 A1* | 4/2016 | McClain | G06F 9/448 |

* cited by examiner

*Primary Examiner* — Kim T Nguyen

(57) ABSTRACT

Methods and systems for developing an object for connecting multiple platforms to a universal framework are disclosed. An interface for developing an object at a computer system is provided. A plurality of developer tools for a universal framework at the interface for use in designing the object is provided, where the tools automatically make use of data by the object, and where the data is generated by a plurality of devices using a plurality of different protocols. A selection of a developer tool from the plurality of developer tools is received at the interface. The object is compiled with the developer tool such that the object will execute at a target device and make use of the data from said plurality of devices using the plurality of different protocols in the universal framework.

18 Claims, 6 Drawing Sheets

Process
600

```
AN INTERFACE FOR DEVELOPING AN OBJECT IS PROVIDED AT A COMPUTER SYSTEM.
602
              ↓
DEVELOPER TOOLS ARE PROVIDED FOR A UNIVERSAL FRAMEWORK AT THE INTERFACE
FOR USE IN DESIGNING THE OBJECT WHEREIN THE TOOLS AUTOMATICALLY MAKE USE
OF DATA BY THE OBJECT WHEREIN THE DATA IS GENERATED BY A PLURALITY OF
DEVICES USING A PLURALITY OF DIFFERENT PROTOCOLS.
604
              ↓
A SELECTION OF A DEVELOPER TOOL FROM THE PLURALITY OF DEVELOPER TOOLS IS
RECEIVED AT THE INTERFACE.
606
              ↓
THE OBJECT WITH THE DEVELOPER TOOL IS COMPILED SUCH THAT THE OBJECT WILL
EXECUTE AT A TARGET DEVICE AND MAKE USE OF THE DATA FROM THE PLURALITY OF
DEVICES USING THE PLURALITY OF DIFFERENT PROTOCOLS IN THE UNIVERSAL
FRAMEWORK.
608
```

Process
600

AN INTERFACE FOR DEVELOPING AN OBJECT IS PROVIDED AT A COMPUTER SYSTEM.
602

DEVELOPER TOOLS ARE PROVIDED FOR A UNIVERSAL FRAMEWORK AT THE INTERFACE FOR USE IN DESIGNING THE OBJECT WHEREIN THE TOOLS AUTOMATICALLY MAKE USE OF DATA BY THE OBJECT WHEREIN THE DATA IS GENERATED BY A PLURALITY OF DEVICES USING A PLURALITY OF DIFFERENT PROTOCOLS.
604

A SELECTION OF A DEVELOPER TOOL FROM THE PLURALITY OF DEVELOPER TOOLS IS RECEIVED AT THE INTERFACE.
606

THE OBJECT WITH THE DEVELOPER TOOL IS COMPILED SUCH THAT THE OBJECT WILL EXECUTE AT A TARGET DEVICE AND MAKE USE OF THE DATA FROM THE PLURALITY OF DEVICES USING THE PLURALITY OF DIFFERENT PROTOCOLS IN THE UNIVERSAL FRAMEWORK.
608

FIG. 6

UNIVERSAL FRAMEWORK FOR CONNECTIVITY OF DEVICES AND DEVELOPMENT TOOLS

RELATED APPLICATIONS

This application claims priority to and is a divisional application of the co-pending patent application having application Ser. No. 15/081,724, entitled "UNIVERSAL FRAMEWORK FOR CONNECTIVITY OF DEVICES AND DEVELOPMENT TOOLS," with filing date Mar. 25, 2016, by Allen Bauer, et al., and assigned to the assignee of the present invention, the disclosure of which is hereby incorporated herein by reference in its entirety.

FIELD OF THE TECHNOLOGY

The present technology relates generally to a universal framework for connectivity of devices.

BACKGROUND

Modern technology has a seen a proliferation of electronic devices. Electronic devices can be handheld, mobile, stationary, large, or small. The devices may be networked to one another or may have network capabilities that allow them to send and receive data. The electronic devices may or may not be wireless and may or may not gather or generate data.

The drawings referred to in this description of embodiments should be understood as not being drawn to scale except if specifically noted.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "detecting," "receiving," "converting," "providing," "changing," "displaying," "sending," "compiling," or the like, refer to the actions and processes of an electronic computing device or system such as: a processor, a memory, a handheld mobile device, a smart phone, a cellular telephone, a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Universal Framework for Connectivity of Devices and Development Tools Embodiments of the present technology provide a universal framework for connectivity of devices that allows data to be sent and received using a variety of different protocols and formats. The present technology also provides tools to a developer within the universal framework such that a developer may use the tools to develop software, apps, or other objects that make use of the data generated by the devices without requiring the developer to build specific tools to take make use of the data with the different protocols and formats. The tools may be re-used numerous times and for different purposes. The tools save a developer time by automating portions of the development process. Moreover, the software, app, or other object developed may be automatically developed into multiple versions for use on a variety of platforms. The automated processes of the present technology improve the performance of the computing systems that the present technology employs. Thus the present technology allows improves the usefulness of the data as well as the usefulness and performance of the devices generating and employing the data and the devices used by developers to create software that makes use of the data. With the proliferation of wireless devices there has been a proliferation of data that is generated by the devices and is sent to other devices. In one embodiment, the tools of the present technology allow a developer who is not a non-programmer to develop an app without having to code or program lines of code to use the data generated by the described devices.

Wireless devices communicate or send and receive data using protocols. The protocols may or may not be standard. For example, there are proprietary protocols, but there are also numerous standard protocols for transmitting wireless data. Additionally, the data is formatted in a variety of standards. In the future as there will be more protocols and formats, updates will be provided to existing protocols and formats. In an environment, there may be several devices that are capable of gathering or generating data and then sending the data to other devices to make use of the data. This creates an ecosystem of devices exchanging data. The devices gathering, generating, exchanging, and making use of the data may be described as the Internet of Things (IoT). Each device may also employ different or similar application program interfaces (APIs).

The devices may all be using different wireless protocols, data formats, and APIs. Therefore, in prior solutions a device that can make use of the data generated by various devices may not be able to receive the data in the format or over the protocol used by the device generating the data. Therefore, the data being generated is not fully utilized. Moreover, the, that makes use of the data, but in prior solutions the developer was required to develop tools or processes to make use of each different API and interface for data from each type of device that is employed by the developers. In prior solutions these tools were re-created or specifically adapted by the developer for each new software created.

In one embodiment, an ecosystem may have local devices such as a scale for weighing a user and a thermostat for controlling heating and air conditioning. The local devices are electronic and have wireless capabilities. A user in the ecosystem may have a device such a smart phone or mobile device that is capable of making use of the data generated or gathered by the local devices. While the mobile device may have software or apps that can make use of the data, a developer may desire to make a new piece of software or app that also makes use of that data. For example, a developer may wish to make an app that uses data from a plurality of devices that were not combined into one app before. Or the developer may have new techniques for processing and employing the data that a user desires. The developer may also develop apps that can send commands to the local devices where previous apps did not allow the user to send such commands.

Universal Framework for Connectivity of Devices and Developer Tools

Referring to the figures, exemplary embodiments of the technology will now be described. The following description will focus on embodiments of the present technology comprising systems and methods for connecting multiple platforms to a universal framework and for developing an object for connecting multiple platforms to a universal framework.

Figure 1:
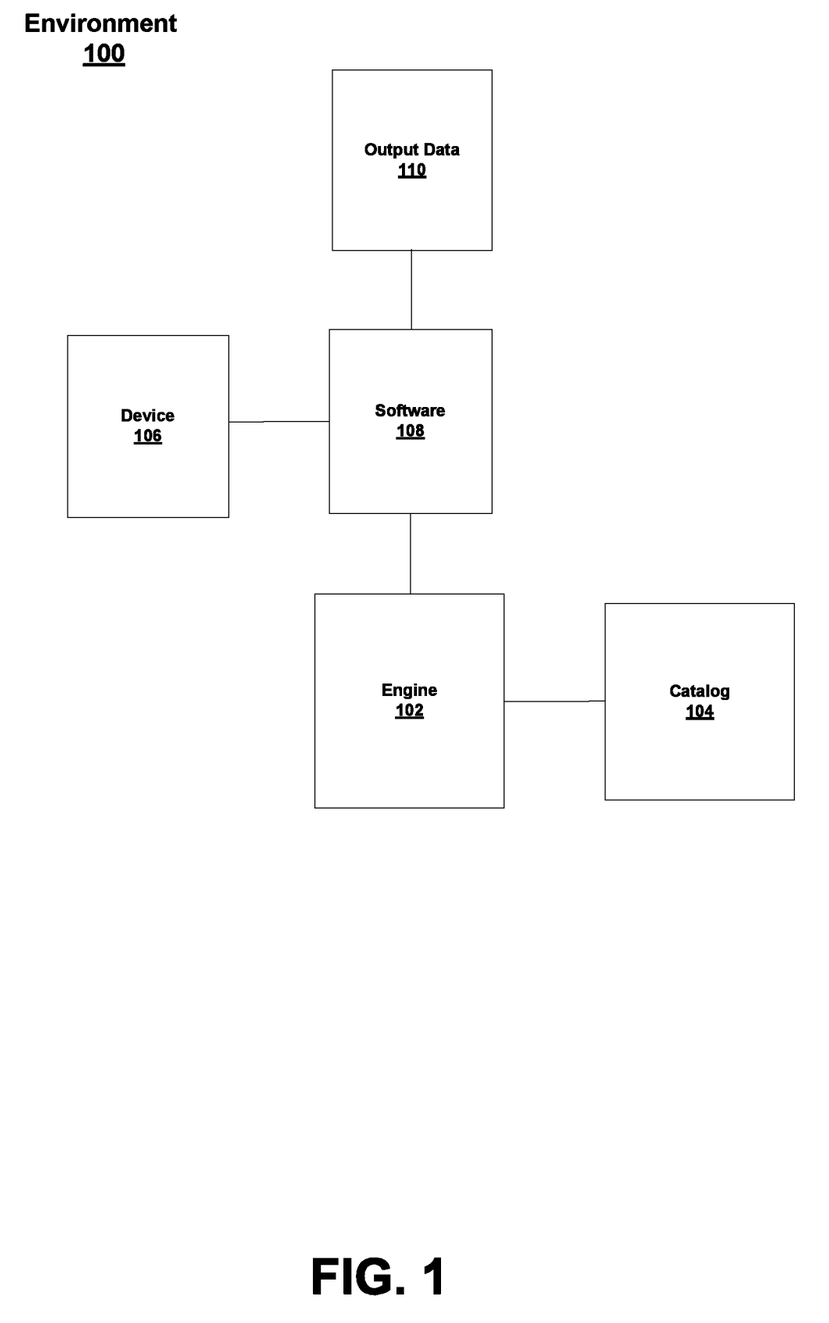
FIG. 1 is a block diagram of an environment for a universal framework with and engine and at least one connected device in accordance with embodiments of the present technology.

FIG. 1 is a block diagram illustrating environment 100 which is an example environment comprising engine 102. Engine 102 is for use in an environment where standards are lacking for protocols or APIs where devices generate data In one embodiment, engine 102 is for connection protocols that allow data from a plurality of devices, such as device 106, in a plurality of different formats and protocols to be useful to a software, apps, and other objects such as software 108. The data may comprises metadata and may describe output data generated by device 106 as well as properties, methods, and events related to device 106. Such plurality of devices may generate data or metadata that the software, apps, or other object can make use of but may not be able to make use of because of the protocol or API that the data is presented in or that the device communicates with. Therefore, a developer of the software, app or other object must develop code or adapt existing code for the specific protocol or API of each and every device. In the present technology, engine 102 is able to provide connection protocols so that software 108 may automatically make use of data from device 106 without software 108 specifically being programmed to do so. Therefore, the present technology solves a problem inherent to developing and executing a software application in the field of computing technology. In one embodiment, software 108 makes use of data from device 106 and then generates output data 110. Output data 110 may be data from device 106 that has been manipulated or otherwise operated upon or may be data that is not directly related to the data from device 106. The present technology allows a developer to develop a software such as software 108 to group devices together that previously were not grouped together without developing code specifically for such groupings. The present technology may be described as de-normalizing data and protocols.

In one embodiment, engine 102 describes connection protocols to allow software 108 to make use of the data from device 106. For example, engine 102 may map power management events (PME) for any device, such as wake-up commands, for any device without requiring a software developer to develop code specifically for such mapping. In one embodiment, engine 102 generates code automatically for use by software 108. Engine 102 may rely upon data and code from catalog 104. In one embodiment, catalog 104 is a database accessed by engine 102 and may be networked or otherwise connected to engine 102. Catalog 104 may be physically connected to engine 102 or remote to engine 102. Catalog 104 may be stored in the cloud. In one embodiment, catalog 104 catalogs data types, protocols, and APIs for a plurality of devices or network devices such as device 106. Catalog 104 also catalogs metadata types, protocols, and APIs used by devices such as device 106. Catalog 104 may be populated or updated from a variety of sources including third party vendors.

In one embodiment, engine 102 is capable of detecting all devices that are connected to or associated with software 108. Engine 102 is then able to receive data and metadata from the device via a first protocol and convert the data and/or metadata to any number of a plurality of protocols. Thus software 108 may make use of the data or metadata in a protocol chosen by software 108 or by the developer of software 108. Protocols used and described herein may be wireless or wired protocols for data and metadata and may include, but is not limited to, JavaScript Object Notation (JSON) packets, EXtensible Markup Language (XML), Interactive Data Language (IDL), AllJoyn, Wifi, Bluetooth, Bluetooth Low Energy (LE), IoTivity, ANT, Thread, Universal Serial Bus (USB), etc.

Device 106 may refer to a plurality of devices including, but not limited to, health care devices, home automations devices, automotive devices, wearable devices, handheld devices, security devices, a pulse oximeter, a heart rate monitor, a Bluetooth scale, a smartwatch, a thermometer, a moisture sensor, a motion detector, a door lock, a smoke detector, a carbon dioxide detector, a home theater receiver, a media player device, a security system, a thermostat, and a passive networked device. Device 106 may be a network device, an electronic device, a wireless device, a wired device, may or may not be battery operated and may be a device that falls under the umbrella of the Internet of Things (IoT). Each thing in IoT may refer to network devices or objects such as handheld devices, stationary devices, vehicles, buildings and other items which are embedded with electronics, software, sensors, and network connectivity, which enables these objects to collect and exchange data. IoT allows the devices to be detected or sensed and data generated or outputted by the devices to be sent or gathered. Additionally, IoT allows some devices to be controlled remotely across existing network infrastructure, creating opportunities for more-direct integration between the physical world and computer-based systems. Each device is uniquely identifiable through its embedded computing system but is able to interoperate within the existing Internet infrastructure. However, each device may use different protocols or APIs for sending data receiving commands.

In one embodiment, engine 102 and catalog 104 may be updated with additional devices, protocols, and/or APIs. Catalog 104 may be described as living as it is intended to be regularly updated. Such updates may be performed remotely over the Internet or using cloud computing. The updates allow new protocols or devices to work with the present technology and further allow developers to continue to develop software or other objects within the context of the present technology that use data and metadata from the new devices, protocols, and APIs without requiring the developer to update catalog 104 or engine 102 or without requiring the developer to write code to use the new devices, protocols, and APIs.

In one embodiment, software 108 is developed using the framework 204 of the present technology as will be described herein. However, software 108 may be developed using a different technique but still make use of engine 102 and catalog 104. It should be appreciated that software 108 may also be employed to control or otherwise send commands to device 106. Software 108 may also be employed to make use of data and metadata from a plurality of other devices not depicted in FIG. 1 where the other devices may or may not use the same protocols and APIs for transmitting data and receiving commands.

The present technology may be employed by seasoned or experience software developer or may also be used by non-experienced users that do not have a programming background. Engine 102 allow a non-experienced user to develop software or other objects without having to know how to code or program software to make use of and control devices such as device 106. For example, devices such as device 106 may have an underlying layer that is used for connectivity, but this layer is not universal across every type of device. The present technology provides a universal layer for every type of device to be connected via engine 102.

Figure 2:
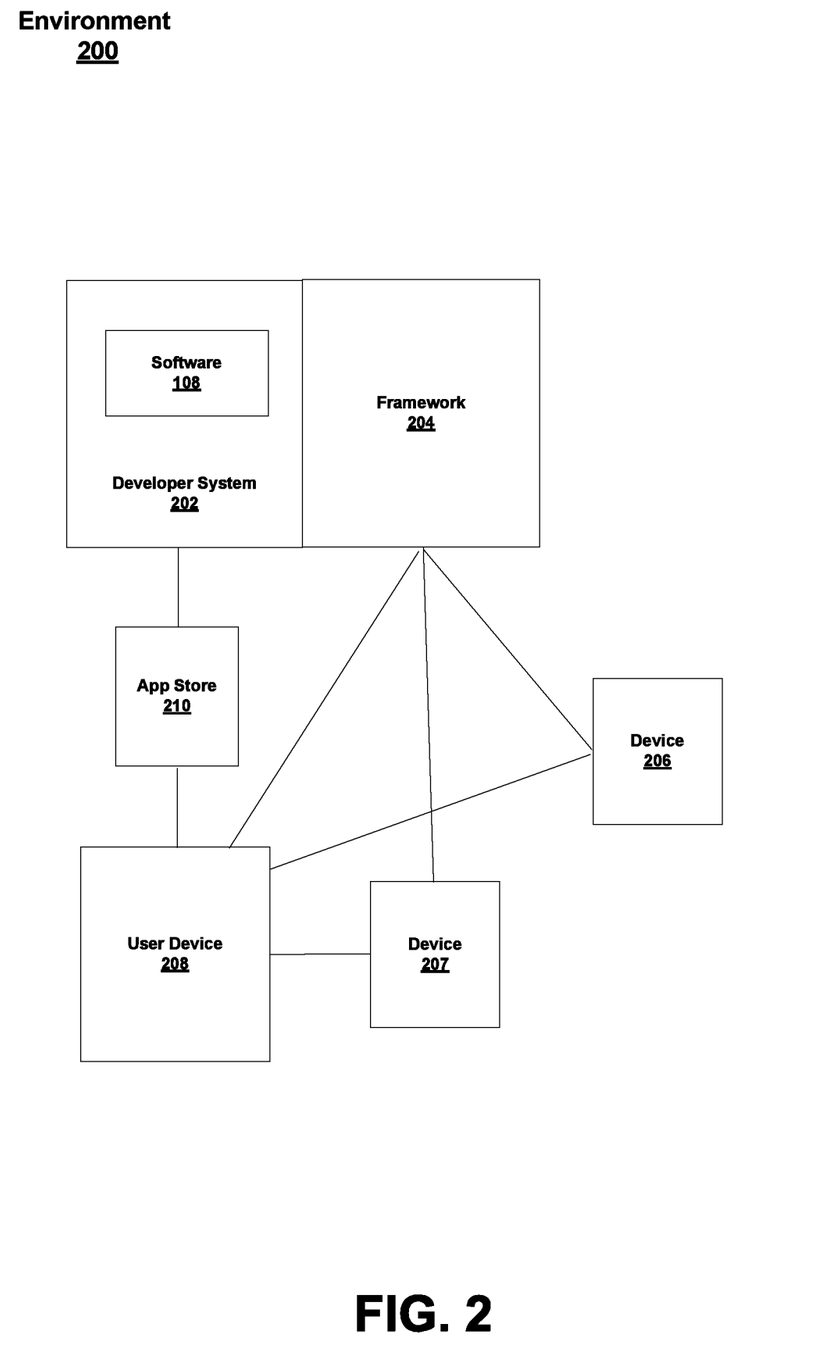
FIG. 2 is a block diagram of an environment for a developer system for developing an object for use in a universal framework in accordance with embodiments of the present technology.

FIG. 2 is a block diagram illustrating environment 200 which is an example environment comprising developer system 202. Developer system 202 is for developing an object, such as software 108, for connecting multiple platforms to a universal framework. It should be appreciated that developer system 202 may be a standard or customized computer system and may be a server, desktop, laptop, tablet, handheld, or other computer system. Developer system 102 may also be a plurality of computers located physically close or remote to one another and may be employed together using cloud computing techniques or server farm techniques. Developer system 202 comprises a memory and processor and other hardware for displaying a graphical user interface (GUI). The GUI provides a developer tools for developing software 108. It should be appreciated that software 108 has all the features and capabilities of software 108 of FIG. 1.

In one embodiment, the GUI provides graphical tools and resources for a developer to develop an application or software object such as software 108. For example, the GUI may provide a library of graphics with buttons or other features that may be used to develop an interface for software 108. The developer may be able to drag and drop an object from the library onto a region of the GUI such that the location of the object in the region of the GUI will be the location of the object in an interface of software 108 when software 108 is executing in a device such as user device 208. In one embodiment, the GUI and its associated tools allows a programmer without coding or programming language skills to develop a software application that will make use of the present technology to use data from a plurality of devices. In one embodiment, the GUI is part of framework 204. In one embodiment, framework 204 comprises engine 102 and catalog 104 of FIG. 1. Framework 204 provides a universal framework for connectivity of devices that allows data to be sent and received using a variety of different protocols and formats In one embodiment, a developer develops an app such as software 108 via developer system 202 and framework 204 wherein software 108 is to be executed on a plurality of different devices. For example, the plurality of different devices may any type of computing system with a variety of different operating systems or platforms. The devices may be laptops, desktops, tablets, smart phones etc. The present technology assists a developer by automatically developing a plurality of different versions of software 108 where each different version is designed to execute on a different platform or operating system. This automated process occurs seamlessly without the developer being required to know coding. The plurality of versions of software 108 may then be sent to app store 210 where they are made available for devices to access or download. For example, app store 210 may be a central repository, library or catalog of software that is available for given device or for a plurality of devices. App store 210 may provide software 108 for free or for a fee. App store 210 may also send updates for software 108 to the given devices after they have been downloaded from app store 210. In one embodiment, software 108 is updated such that data from new protocols, APIs or devices may be used by software 108.

In one embodiment, software 108 is developed to make use of data generated by devices 206 and 207. Software 108 may also send commands or other instructions to devices 206 and 207. Software 108 may also communicate with any number of devices beyond devices 206 and 207. In one embodiment, devices 206 and 207 use APIs or protocols to send and receive data and metadata. The metadata may simply refer to the name or type of device but may also have data more specific to the data generated by the device or information regarding the protocol being used. Devices 206 and 207 may employ protocols such as JavaScript Object Notation (JSON) packets, EXtensible Markup Language (XML), Interactive Data Language (IDL), AllJoyn, Wifi, Bluetooth, Bluetooth Low Energy (LE), IoTivity, ANT, Thread, Universal Serial Bus (USB), etc. In one embodiment, engine 102 of FIG. 1 is able to convert the protocol used by device 206 or 207 to a protocol that is usable by software 108, thus the data generated by device 206 or 207 is usable by software 108. This may be referred to as a universal framework for connectivity of devices.

In one embodiment, software 108 is downloaded by user device 208. User device 208 may be any type of electronic device capable of executing software 108. User device 208 may be a desktop computer, a server, a laptop, a smart phone, a tablet or another mobile device executing an operating system such as Windows, iOS or Android. In one embodiment, either app store 210 or user device 208 is able to determine which version of software 108 is required for user device 208. User device 208 is able to execute software 108 within framework 204 such that data from devices 206 and 207

Figure 3:
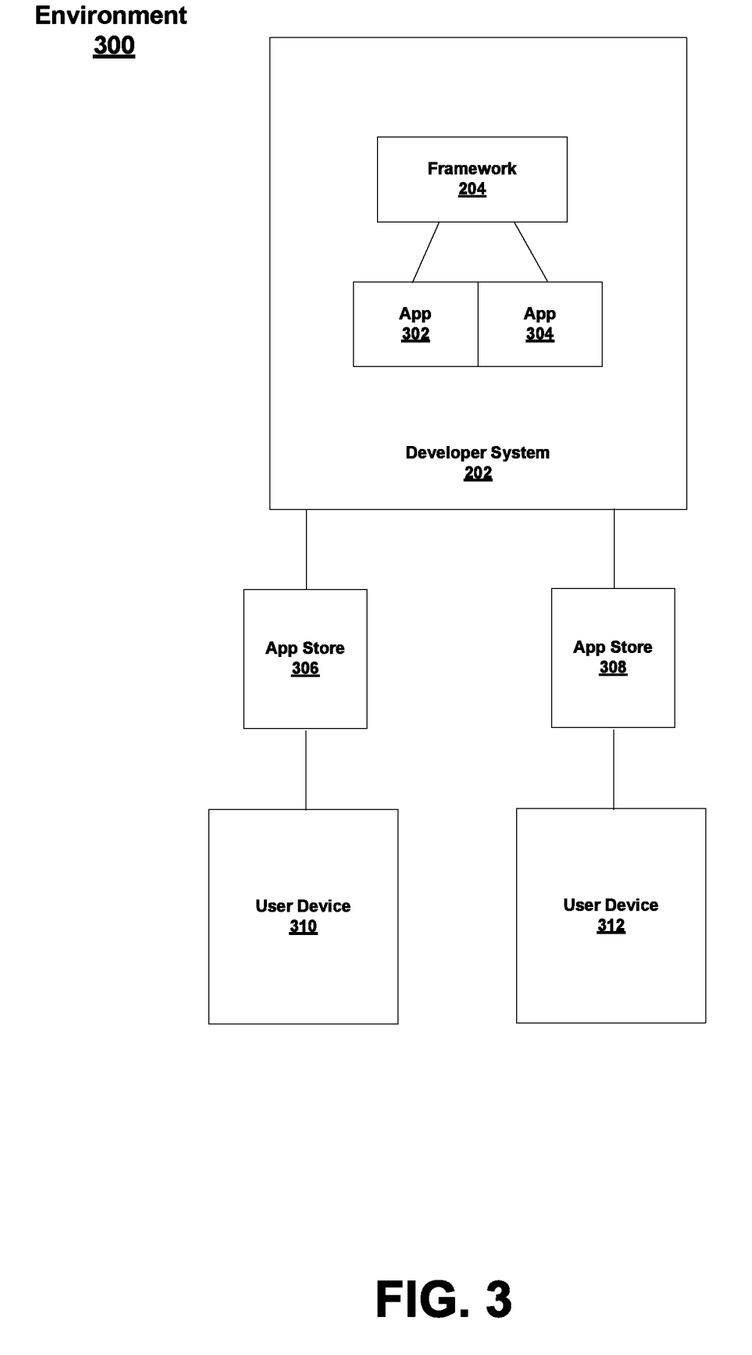
FIG. 3 is a block diagram of an environment for a developer system for developing different version of the same object for use with a plurality of cross platform devices in a universal framework in accordance with embodiments of the present technology.

FIG. 3 is a block diagram illustrating environment 300 which is an example environment comprising developer system 202. Environment 300 depicts an embodiment where developer system 202 comprises framework 204 and framework 204 is employed to automatically develop multiple versions of the same software. For example, a developer may employ developer system 202 to develop a software application such as software 108 of FIG. 2. Framework 204 is then employed to automatically generate app 302 and app 304. App 302 and app 304 are different versions of the same software. For example, app 302 may be a version of software 108 designed to execute in an iOS operating system and app 304 is designed to be executed on an Android operating system. The different versions may then be made available to user devices via app stores. It should be appreciated that app stores 306 and 308 have all the features and capabilities of app store 210 of FIG. 2. For example, app 302 may be made available to user device 310 via app store 306 and app 304 is made available to user device 312 via app store 308. The development of different versions of the software may occur in an automated process such that when developer system 202 is employed to develop the software, the developer may indicate via a GUI that the design of the software is complete. Developer system 202 may then automatically compile code for the software including the different versions of the software.

Figure 4:
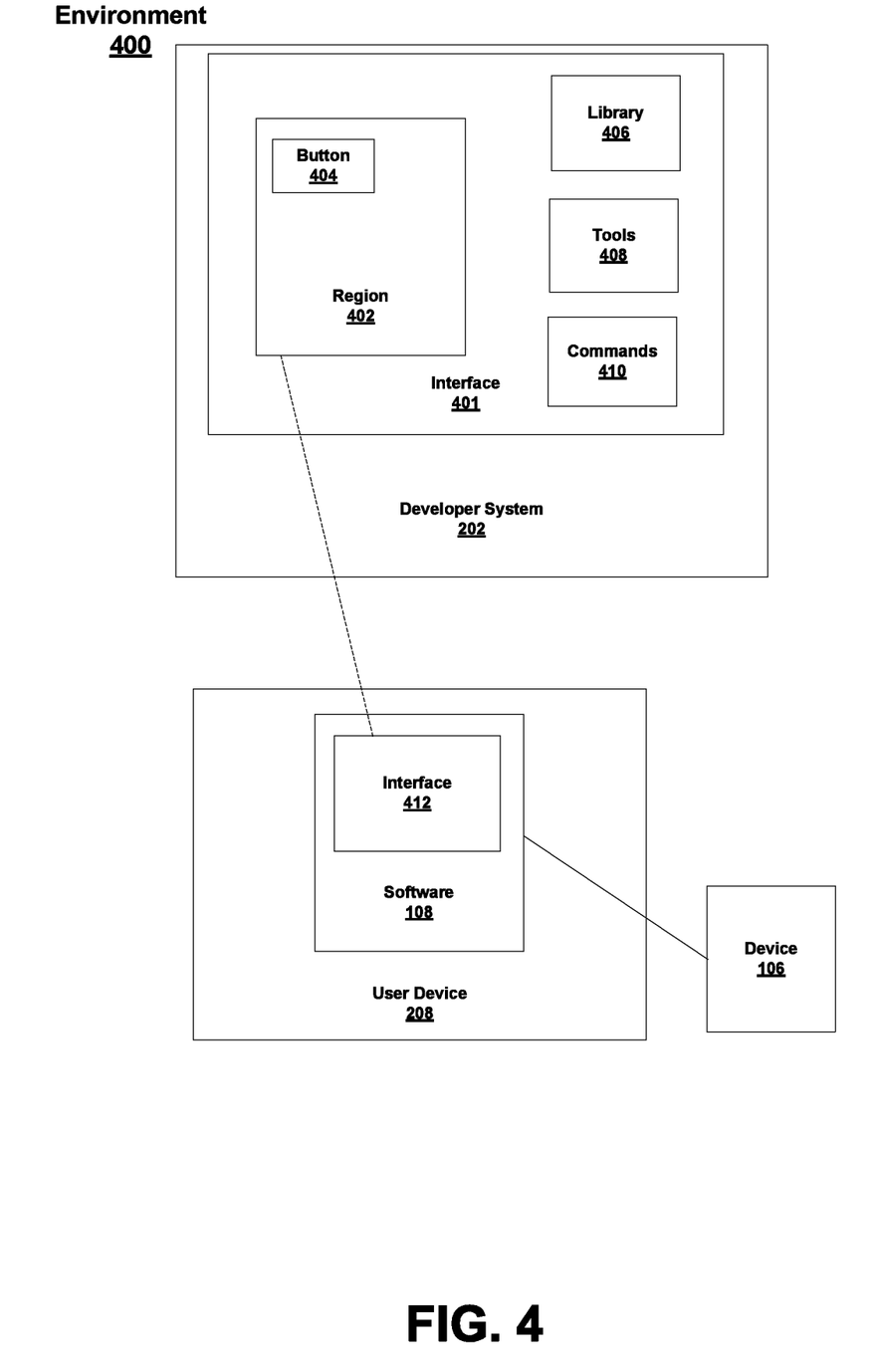
FIG. 4 is a block diagram of an environment for a developer system for developing an object in an interface in accordance with embodiments of the present technology.

FIG. 4 is a block diagram illustrating environment 400 which is an example environment comprising developer system 202. Developer system 202 is depicted with interface 401 where interface 401 is a GUI for designing software 108. Interface 401 comprises library 406, tools 408, and commands 410. In one embodiment, library 406 comprises a library of graphical objects that may be inserted into software 108. For example, library 406 may have a button or other graphical image that is used in software 108 to execute some type of a command such as a menu option for software 108. Another example may be buttons for volume control or for a user of software 108 to change a color screen. Another example may be a text box where a user of software 108 may enter text. The developer may employ interface 401 to click and drag an item from library 406 to region 402 such as button 404. The mouse cursor used in conjunction with the mouse or other input device for developer system 202 may be used to place button 404 in region 402 such the upper left side corner of region 402. This placement will then correspond to where the item, such as button 404, is placed in the interface of software 108 such as interface 412. In other words, what is depicted in region 402 will be depicted in interface 401 of software 108, as indicated by the dotted line linking region 402 to interface 412. Thus a developer with little or no experience in programming and coding may use the present technology to create software 108 that also employs a universal framework to connect devices such as device 106.

Interface 401 also comprises tools 408 which allow the developer to employ various tools in the creation of software 108. For example, tools 408 may comprise commands for selecting which type of devices, such as device 106, that software 108 will gather data from or send commands to while executing. Tools 408 may also be selected to indicate which versions of software 108 are to automatically compiled based on which platforms of devices the developers desires software 108 to be executed on. Commands 410 may be employed to issue other commands in the development of software 108 such as a command to open a file or save a file or to partially compile software 108 to test software 108 that is only partially complete while in the design phase. This may comprise partial compiling and execution within the developer system 202. Commands 410 may also be a command that the development of software 108 is complete and is to be compiled.

Embodiments of the present technology may employ a universal framework of connectivity at both design time of the software application and run time or execution of the software application. For example, FIG. 1 depicts software 108 at run time where software 108 is in communication with device 106 and generating output data 110 based on the data from device 106. In FIG. 1, software 108 relies upon engine 102 and catalog 104 for the universal framework of connectivity. FIGS. 2-4 depict both embodiments of design time and run time. For example, developer system 202 is employed during the design time of software 108. The universal framework of connectivity allows a designer to develop software 108 during design time without having to manually code software 108 for each and every type of API or protocol used by devices that are in communication with software 108.

User device 208 may download and execute a completed version of software 108. Interface 412 is the user interface for software 108 that a user interacts with to use the features and functions of software 108. Software 108 also interacts with device 106 by receiving data from device 106 and may send commands to device 106. In one embodiment, software 108 generates output data 110 as described in FIG. 1.

Operations

Figure 5:
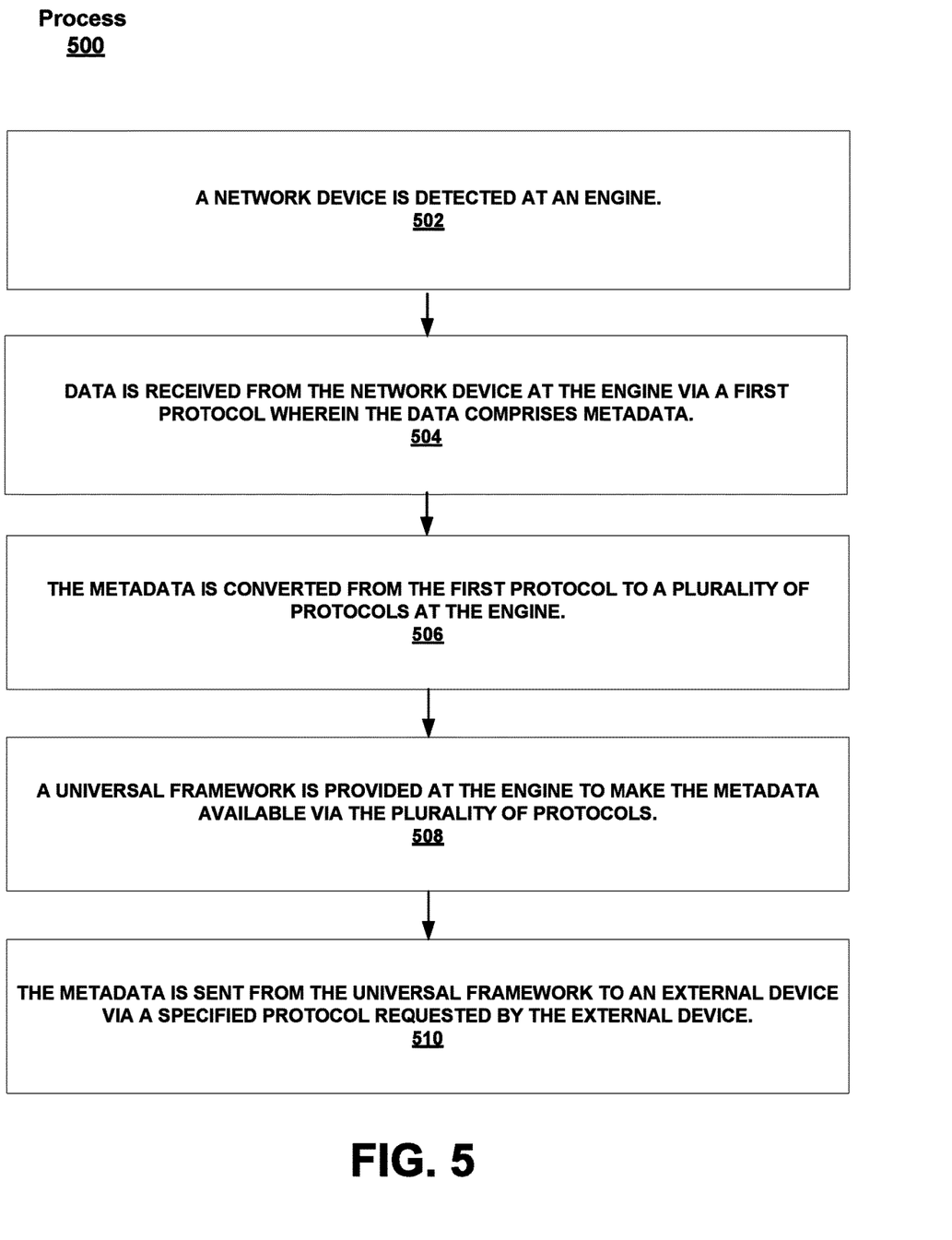
FIG. 5 is a flowchart for connecting multiple platforms to a universal framework in accordance with embodiments of the present technology.

FIG. 5 is a flowchart illustrating process 500 for connecting multiple platforms to a universal framework, in accordance with one embodiment of the present invention. In one embodiment, process 500 is carried out, at least in part, by processors and electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 500 is performed by devices and components depicted in FIGS. 1-4. Embodiments of process 500 improve the performance of a computer system such as a device executing software 108 of FIG. 1 by employing engine 102 and catalog 104 to universally connect devices such as device 106 to software 108.

At 502, a network device is detected at an engine. For example, the network device may be device 106 and the engine may be engine 102 of FIG. 1 and may be, but is not limited to, health care devices, home automations devices, automotive devices, wearable devices, handheld devices, security devices, a pulse oximeter, a heart rate monitor, a Bluetooth scale, a smartwatch, a thermometer, a moisture sensor, a motion detector, a door lock, a smoke detector, a carbon dioxide detector, a home theater receiver, a media player device, a security system, a thermostat, and a passive networked device. The engine may detect a plurality of devices. The devices may be any number of devices and may be devices that send data and receive commands and are described as IoT devices. In one embodiment, the engine may detect a plurality of devices.

At 504, data is received from the network device at the engine via a first protocol wherein the data comprises metadata. The data and metadata may be generated by the device and broadcast over wireless protocols.

At 506, the metadata is converted from the first protocol to a plurality of protocols at the engine. In one embodiment, the engine is able to convert any number of protocols to a protocol or protocols that are useful to software such as software 108. In one embodiment, the engine is updated with additional protocols and methods or procedures for converting protocols.

At 508, a universal framework is provided at the engine to make the metadata available via the plurality of protocols. The universal framework may comprise the engine as well as a catalog such as catalog 104 of FIG. 1 used in conjunction with a software such as software 108.

At 510, the metadata is sent from the universal framework to an external device via a specified protocol requested by the external device. For example, an external device may be a user device such as user device 208 of FIG. 2 that is executing software 108 and requires the data be in a specified protocol. In one embodiment, the external device refers to a device different from user device 208. In one embodiment, the external device is a smart phone, a tablet, a laptop, a desktop, a server, or mobile electronic device.

The first protocol, the specified protocol, or the additional protocols may be AllJoyn, Wifi, serial, Bluetooth LE, JSON, IoTivity, ANT, and Thread or any other protocol. In one embodiment, the external device employs a different platform than the network device.

Figure 6:
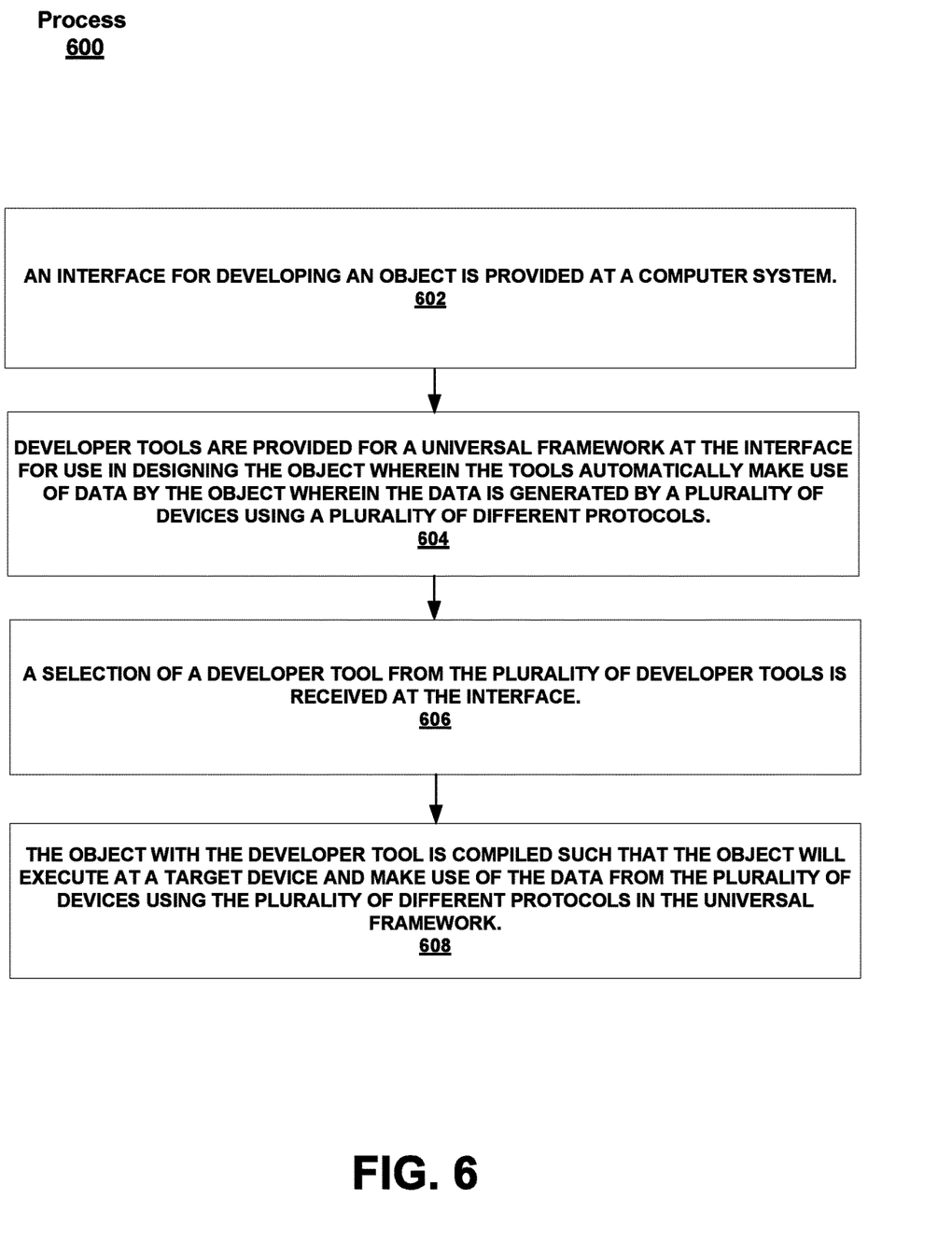
FIG. 6 is a flowchart for non-transitory computer-usable storage medium having instructions embodied therein that when executed cause a computer system to perform a method for developing an object for connecting multiple platforms to a universal framework in accordance with embodiments of the present technology.

FIG. 6 is a flowchart illustrating process 600 for developing an object for connecting multiple platforms to a universal framework, in accordance with one embodiment of the present invention. In one embodiment, process 600 is carried out, at least in part, by processors and electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 600 is performed by devices and components depicted in FIGS. 1-4. Embodiments of process 600 improve the performance of a computer system such as developer system 202 of FIG. 2 by automating procedures to develop an application or software that is universally connect devices such as device 106 of FIG. 1.

At 602, an interface for developing an object is provided at a computer system. In one embodiment, the interface is interface 401 of FIG. 4 and the object is software 108. The software may be developed by a developer that has little or no programming experience.

At 604, developer tools are provided for a universal framework at the interface for use in designing the object wherein the tools automatically make use of data by the object wherein the data is generated by a plurality of devices using a plurality of different protocols. In one embodiment, the developer tools may be library 406, tools 408, and commands 410 of FIG. 4. The object may not make use of the data described until object is actually executed by a user device at run time after the object has been downloaded and installed at the user device. In one embodiment, the data comprises metadata and the metadata is employed by the developer tools.

In one embodiment, the plurality of different devices may be network devices such as device 106 of FIG. 1 and may be, but are not limited to, health care devices, home automations devices, automotive devices, wearable devices, handheld devices, security devices, a pulse oximeter, a heart rate monitor, a Bluetooth scale, a smartwatch, a thermometer, a moisture sensor, a motion detector, a door lock, a smoke detector, a carbon dioxide detector, a home theater receiver, a media player device, a security system, a thermostat, and a passive networked device.

At 606, a selection of a developer tool from the plurality of developer tools is received at the interface. For example, the developer may select button 404 from library 406 of FIG. 4.

At 608, the object with the developer tool is compiled such that the object will execute at a target device and make use of the data from the plurality of devices using the plurality of different protocols in the universal framework. The target device may be user device 208 of FIG. 2. In one embodiment, the different protocols may refer to AllJoyn, Wifi, serial, Bluetooth LE, JSON, IoTivity, ANT, and Thread.

In one embodiment, when the object is compiled, the object is automatically compiled into a plurality of different versions of the same object such that the different versions may be employed by different platforms of user devices using different operating systems.

Example Computer System Environment

The present technology may be carried out, associated with or otherwise practiced with a computer system. Portions of the present technology are composed of computer-readable and computer-executable instructions that reside, for example, in computer-usable media of a computer system or other user device such as computer system 102 and/or database 110 of FIG. 1. Described below is an example computer system or components that may be used for or in conjunction with aspects of the present technology such as a method for improving run-time performance of a database.

It is appreciated that that the present technology can operate on or within a number of different computer systems including general purpose networked computer systems, embedded computer systems, a personal computer such as a desktop computer, a laptop, a notebook, an electronic hand-held device, a personal digital assistant, a smart phone, a tablet computer, a net book, user devices, and the like. The computer system is well adapted to having peripheral computer readable media such as, for example, a floppy disk, a compact disc, flash memory and the like coupled thereto.

The computer system includes an address/data bus for communicating information, and a processor coupled to bus for processing information and instructions. The computer system is also well suited to a multi-processor or single processor environment and also includes data storage features such as a computer usable volatile memory, e.g. random access memory (RAM), coupled to bus for storing information and instructions for processor(s).

The computer system may also include computer usable non-volatile memory, e.g. read only memory (ROM), as well as input devices such as an alpha-numeric input device, a mouse, or other commonly used input devices. The computer system may also include a display such as liquid crystal device, cathode ray tube, plasma display, and other output components such as a printer or other common output devices.

The computer system may also include one or more signal generating and receiving device(s) coupled with a bus for enabling the system to interface with other electronic devices and computer systems. Signal generating and receiving device(s) of the present embodiment may include wired serial adaptors, modems, and network adaptors, wireless modems, and wireless network adaptors, and other such communication technology. The signal generating and receiving device(s) may work in conjunction with one or more communication interface(s) for coupling information to and/or from the computer system. A communication interface may include a serial port, parallel port, Universal Serial Bus (USB), Ethernet port, antenna, or other input/output interface. A communication interface may physically, electrically, optically, or wirelessly (e.g. via radio frequency) couple the computer system with another device, such as a cellular telephone, radio, a handheld device, a smart phone, or computer system.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A non-transitory computer-usable storage medium having instructions embodied therein that when executed cause a computer system to perform a method for developing an object for connecting multiple platforms to a universal framework, said method comprising:

providing an interface for developing an object at a computer system;

providing a plurality of developer tools for a universal framework at said interface for use in designing said object, wherein said tools automatically make use of data by said object, and wherein said data is generated by a plurality of devices using a plurality of different protocols;

receiving a selection of a developer tool from said plurality of developer tools at said interface; and compiling said object with said developer tool such that said object will execute at a target device and make use of said data from said plurality of devices using said plurality of different protocols in said universal framework.

2. The non-transitory computer-usable storage medium as recited by claim 1, wherein said object is a software application and said compiling automatically compiles said software application into a plurality of versions for cross platform target devices.

3. The non-transitory computer-usable storage medium as recited by claim 1, wherein said data comprises metadata and said metadata is employed by said plurality of developer tools.

4. The non-transitory computer-usable storage medium as recited by claim 1, wherein said plurality of devices are selected from the list of network devices consisting of: a pulse oximeter, a heart rate monitor, a Bluetooth scale, a smartwatch, a thermometer, a moisture sensor, a motion detector, a door lock, a smoke detector, a carbon dioxide detector, a home theater receiver, a media player device, a security system, a thermostat, and a passive networked device.

5. The non-transitory computer-usable storage medium as recited by claim 1, wherein said plurality of different protocols are selected from the list of protocols consisting of: AllJoyn, Wifi, serial, Bluetooth LE, JSON, IoTivity, ANT, and Thread.

6. The non-transitory computer-usable storage medium as recited by claim 1, wherein said plurality of developer tools comprise a library of graphics.

7. The non-transitory computer-usable storage medium as recited by claim 6, wherein said library of graphics comprises a button for placement within said interface.

8. The non-transitory computer-usable storage medium as recited by claim 7, wherein said selection is received at said button within said interface.

9. The non-transitory computer-usable storage medium as recited by claim 1, wherein said plurality of developer tools comprise commands for selecting types said plurality of devices will make use of said data.

10. A method for developing an object for connecting multiple platforms to a universal framework, said method comprising:

providing an interface for developing an object at a computer system;

providing a plurality of developer tools for a universal framework at said interface for use in designing said object, wherein said tools automatically make use of data by said object, and wherein said data is generated by a plurality of devices using a plurality of different protocols;

receiving a selection of a developer tool from said plurality of developer tools at said interface; and compiling said object with said developer tool such that said object will execute at a target device and make use of said data from said plurality of devices using said plurality of different protocols in said universal framework.

11. The non-transitory computer-usable storage medium as recited by claim 10, wherein said object is a software application and said compiling automatically compiles said software application into a plurality of versions for cross platform target devices.

12. The non-transitory computer-usable storage medium as recited by claim 10, wherein said data comprises metadata and said metadata is employed by said plurality of developer tools.

13. The non-transitory computer-usable storage medium as recited by claim 10, wherein said plurality of devices are selected from the list of network devices consisting of: a pulse oximeter, a heart rate monitor, a Bluetooth scale, a smartwatch, a thermometer, a moisture sensor, a motion detector, a door lock, a smoke detector, a carbon dioxide detector, a home theater receiver, a media player device, a security system, a thermostat, and a passive networked device.

14. The non-transitory computer-usable storage medium as recited by claim 10, wherein said plurality of different protocols are selected from the list of protocols consisting of: AllJoyn, Wifi, serial, Bluetooth LE, JSON, IoTivity, ANT, and Thread.

15. The non-transitory computer-usable storage medium as recited by claim 10, wherein said plurality of developer tools comprise a library of graphics.

16. The non-transitory computer-usable storage medium as recited by claim 15, wherein said library of graphics comprises a button for placement within said interface.

17. The non-transitory computer-usable storage medium as recited by claim 16, wherein said selection is received at said button within said interface.

18. The non-transitory computer-usable storage medium as recited by claim 10, wherein said plurality of developer tools comprise commands for selecting types said plurality of devices will make use of said data.

* * * * *